(12) United States Patent
Yang

(10) Patent No.: US 12,316,943 B2
(45) Date of Patent: May 27, 2025

(54) CAMERA MODULE AND ELECTRONIC DEVICE EMPLOYING A CATADIOPTRIC LENS ARRANGEMENT

(71) Applicant: VIVO MOBILE COMMUNICATION CO., LTD., Guangdong (CN)

(72) Inventor: Zhuojian Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 175 days.

(21) Appl. No.: 18/357,290

(22) Filed: Jul. 24, 2023

(65) Prior Publication Data

US 2024/0022804 A1 Jan. 18, 2024

Related U.S. Application Data

(63) Continuation of application No. PCT/CN2022/072862, filed on Jan. 20, 2022.

(30) Foreign Application Priority Data

Jan. 26, 2021 (CN) .......................... 202110103420.2

(51) Int. Cl.
*H04N 5/335* (2011.01)
*H04N 23/55* (2023.01)
*H04N 23/57* (2023.01)
*H04N 23/68* (2023.01)

(52) U.S. Cl.
CPC ............. *H04N 23/55* (2023.01); *H04N 23/57* (2023.01); *H04N 23/687* (2023.01)

(58) Field of Classification Search
None
See application file for complete search history.

(56) References Cited

U.S. PATENT DOCUMENTS

| | | | | |
|---|---|---|---|---|
| 4,342,503 | A * | 8/1982 | Shafer | G02B 17/0856 359/729 |
| 5,159,495 | A * | 10/1992 | Hamblen | G02B 17/0808 359/736 |
| 6,169,637 | B1 * | 1/2001 | Tsunashima | G02B 17/086 359/732 |
| 10,514,529 | B2 * | 12/2019 | Dainty | G02B 7/04 |
| 12,066,609 | B2 * | 8/2024 | Sinclair | G02B 27/141 |
| 2014/0049841 | A1 | 2/2014 | Ryu | |

(Continued)

FOREIGN PATENT DOCUMENTS

| CN | 110798602 A | 2/2020 |
|---|---|---|
| CN | 110888216 A | 3/2020 |

(Continued)

*Primary Examiner* — Gary C Vieaux
(74) *Attorney, Agent, or Firm* — Price Heneveld LLP

(57) ABSTRACT

Disclosed are a camera module and an electronic device. The camera module includes a first lens, a second lens, and a photosensitive chip that are coaxially disposed in a first direction sequentially, where a first reflective film is disposed on a side of the first lens away from the second lens; a second reflective film is disposed on a side of the first lens close to the second lens; the second lens is entirely provided with a third reflective film on a side close to the photosensitive chip; a light-transmitting hole is provided on a middle part of the side of the second lens close to the photosensitive chip; and at least two adjusting lenses are disposed in the light-transmitting hole.

18 Claims, 1 Drawing Sheet

(56) References Cited

U.S. PATENT DOCUMENTS

2015/0177496 A1* 6/2015 Marks ................ G02B 17/0856
                                                        348/335
2020/0110255 A1    4/2020 Bauman et al.
2021/0396979 A1* 12/2021 Nitta ..................... G02B 13/18

FOREIGN PATENT DOCUMENTS

| CN | 210155397 U   | 3/2020  |
|----|---------------|---------|
| CN | 111722366 A   | 9/2020  |
| CN | 112887564 A   | 6/2021  |
| WO | 2020264454 A1 | 12/2020 |

* cited by examiner

CAMERA MODULE AND ELECTRONIC DEVICE EMPLOYING A CATADIOPTRIC LENS ARRANGEMENT

CROSS-REFERENCE TO RELATED APPLICATIONS

The present application is a continuation application of International Application No. PCT/CN2022/072862, filed on Jan. 20, 2022. International Application No. PCT/CN2022/072862 claims priority to Chinese Patent Application No. 202110103420.2, filed with the China National Intellectual Property Administration on Jan. 26, 2021, and entitled "CAMERA MODULE AND ELECTRONIC DEVICE". Each of the above-listed applications is incorporated herein by reference in its entirety.

TECHNICAL FIELD

This application belongs to the technical field of consumer electronic devices, and in particular, relates to a camera module and an electronic device.

BACKGROUND

With the development of electronic device technologies, requirements for appearances of electronic devices become increasingly high. Particularly, in the aspect of thicknesses of electronic devices, a thinner electronic device can provide a user with a better a grip feeling and improve use experience of the user. Moreover, it is necessary to meet demand of a user for using an electronic device to take pictures and videos. Therefore, manufacturers further improve an imaging effect by changing a structure of a camera module.

For a camera module with an optical zoom, in order to increase a shooting distance of the camera module and achieve 10× or greater zooming, the camera module needs to have a longer focal length. This usually needs to increase a size of the camera module. Correspondingly, a thickness of the electronic device is increased, resulting in poor user experience.

Therefore, it is necessary to improve a camera module of an electronic device, thereby resolving a problem that a thickness of the electronic device is increased due to an increased size of the camera module.

SUMMARY

According to a first aspect, an embodiment of this application provides a camera module. The camera module includes a first lens, a second lens, and a photosensitive chip that are coaxially disposed in a first direction sequentially. The first direction is a thickness direction of the camera module. A clearance is disposed between every two of the first lens, the second lens, and the photosensitive chip. A first reflective film is disposed on a side of the first lens away from the second lens. A second reflective film is disposed on a side of the first lens close to the second lens. The second lens is entirely provided with a third reflective film on a side close to the photosensitive chip. A light-transmitting hole is provided on a middle part of the side of the second lens close to the photosensitive chip. At least two adjusting lenses are disposed in the light-transmitting hole.

According to a second aspect, an embodiment of this application provides an electronic device. The electronic device is provided with the camera module described above.

BRIEF DESCRIPTION OF DRAWINGS

The accompanying drawings described herein are intended to provide further understanding of this application, and constitute a part of this application. Example embodiments of this application and descriptions thereof are intended to describe this application, but do not constitute inappropriate limitations to this application. In the accompanying drawings.

Figure 1:
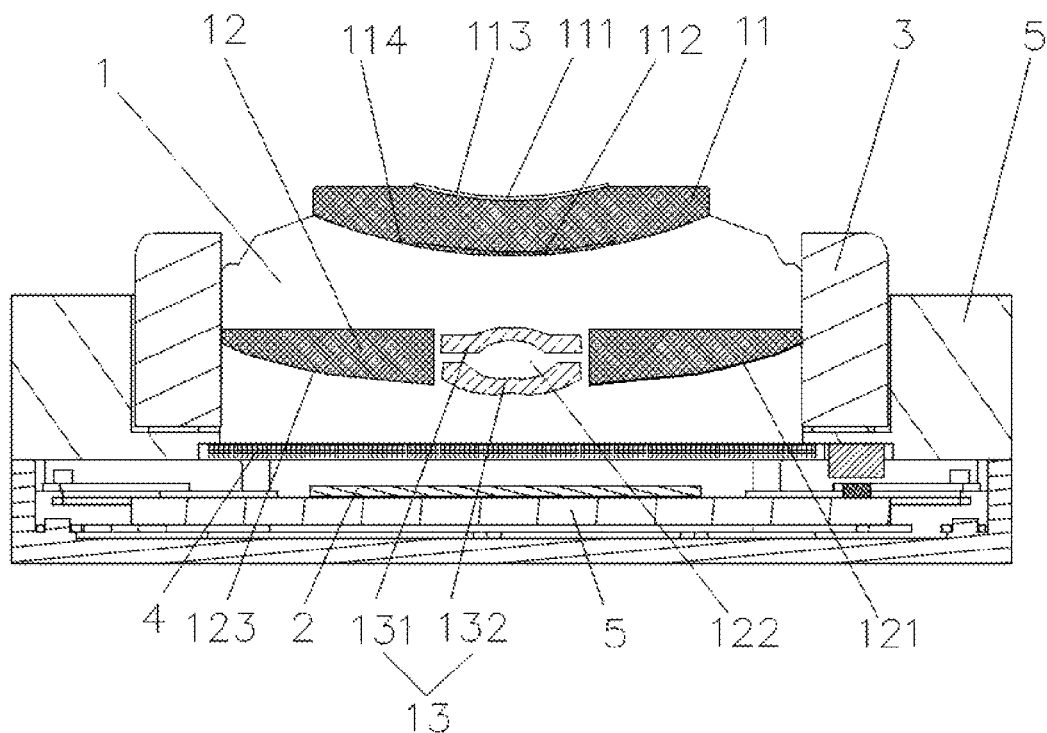
FIG. 1 is a sectional view of a camera module according to an embodiment of this application.

Reference numerals in the accompanying drawings are as follows:

1: lens assembly; 11: first lens; 111: first reflective film; 112: second reflective film; 113: first arc surface; 114: second arc surface; 12: second lens; 121: third reflective film; 122: light-transmitting hole; 123: third arc surface; 13: adjusting lens; 131: third lens; 132: fourth lens; 2: photosensitive chip; 3: stabilization motor; 4: filter; 5: circuit board; and 6: bracket.

DESCRIPTION OF EMBODIMENTS

The following clearly describes technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that, data termed in such a way is interchangeable in proper circumstances, so that the embodiments of this application can be implemented in an order other than the order illustrated or described herein. In addition, in the specification and claims, "and/or" represents at least one of connected objects, and a character "/" generally represents an "or" relationship between associated objects.

With reference to the accompanying drawings, an electronic device in an embodiment of this application is described in detail below based on specific embodiments and application scenarios thereof.

As shown in FIG. 1, a camera module is provided. The camera module includes a first lens 11, a second lens 12, and a photosensitive chip 2 that are coaxially disposed in a first direction sequentially. The first direction is a thickness direction of the camera module. A clearance is disposed between every two of the first lens 11, the second lens 12, and the photosensitive chip 2. A first reflective film 111 is disposed on a side of the first lens 11 away from the second lens 12. A second reflective film 112 is disposed on a side of the first lens 11 close to the second lens 12. The second lens 12 is entirely provided with a third reflective film 121 on a side close to the photosensitive chip 2. A light-transmitting hole 122 is provided on a middle part of the side of the second lens 12 close to the photosensitive chip 2. At least two adjusting lenses 13 are disposed in the light-transmitting hole 122. As shown in FIG. 1, the first lens 11 is disposed above the second lens 12, and a top surface of the first lens 11 is a light input surface. Moreover, the first reflective film 111 on the top surface of the first lens 11 can prevent light from being incident to the light-transmitting hole 122 directly; and the light is incident to the second lens 12 from a circumference on the top surface of the first lens 11. Because the third reflective film 121 is disposed on a bottom surface of the second lens 12, light cannot be incident to an interior of the camera module and be received by the photosensitive chip 2. The light is reflected to a bottom surface of the first lens 11. The second reflective film 112 on the bottom surface of the first lens 11 reflects the light into the light-transmitting hole 122. The light passes through the adjusting lenses 13 in the light-transmitting hole 122. The adjusting lenses 13 can disperse the light in the light-transmitting hole 122, so that the photosensitive chip 2 can receive an optical signal by a maximum area. After receiving the optical signal, the photosensitive chip 2 converts the optical signal into an electrical signal. After being reflected multiple times, the optical signal received by the photosensitive chip 2 has a larger magnification. It is also ensured that the photosensitive chip 2 can receive light by a larger area, thereby ensuring an excellent imaging effect. In addition, a thickness of the camera module can be decreased, too. When the camera module is mounted in an electronic device, the following case is avoided: A thickness of an electronic device is affected due to a large thickness of a camera module. This can not only increase a shooting distance of the camera module, but also decrease a thickness of the electronic device.

Specifically, due to cooperation between the first reflective film 111 and the third reflective film 121, light can be prevented from being directly incident into the light-transmitting hole 122 and received by the photosensitive chip 2. Therefore, a preset zoom factor is achieved. This further improves the imaging effect of the camera module.

Optionally, as shown in FIG. 1, a middle part on the side, away from the second lens 12, of the first lens 11 is provided with a first arc surface 113; a circumference on the side, away from the second lens 12, of the first lens 11 is a plane; the first reflective film 111 covers the first arc surface 113; the side, close to the second lens 12, of the first lens 11 is provided with a second arc surface 114; a side, away from the photosensitive chip 2, of the second lens 12 is a plane; the side, close to the photosensitive chip 2, of the second lens 12 is provided with a third arc surface 123; and the first arc surface 113, the second arc surface 114, and the third arc surface 123 are all arranged towards the first direction. The first arc surface 113 can not only receive more incident light, but also reflect the incident light to ensure that the incident light is emitted in a dispersed manner. This prevents the incident light from being incident and emitted perpendicularly. A circumference on the top surface of the first lens 11 is a plane; and a top surface of the second lens 12 is also a plane. This can ensure that more incident light is emitted to the third reflective film 121. The bottom surface of the first lens 11 is an arc surface; and the bottom surface of the first lens 11 is provided with the second arc surface 114. The first lens 11 can refract incident light, to ensure that the incident light can be emitted to the third reflective film 121 as much as possible. The third reflective film 121 can reflect more light to the second reflective film 112. The second reflective film 112 is disposed on the second arc surface 114. The arc-shaped second reflective film 112 can gather received light and reflect the light into the light-transmitting hole 122. Therefore, a quantity of optical signals that can be received by the photosensitive chip 2 is increased, thereby improving imaging quality of the camera module.

Optionally, as shown in FIG. 1, the adjusting lenses 13 include a third lens 131 and a fourth lens 132 in the first direction sequentially; a middle part of the third lens 131 protrudes in a second direction; a middle part of the fourth lens 132 protrudes in the first direction; a central region of the fourth lens 132 protrudes in the first direction; and the first direction is opposite to the second direction. After being reflected by the second reflective film 112, light is emitted to the third lens 131 in the light-transmitting hole 122. The third lens 131 further gathers the light, thereby avoiding loss of the light caused when the light is refracted to a hole wall of the light-transmitting hole 122. All light gathered by the third lens 131 is emitted to the fourth lens 132. After passing through the fourth lens 132, the light is refracted and dispersed. There is a specific clearance between the photosensitive chip 2 and the fourth lens 132. The fourth lens 132 is arranged close to a bottom of the light-transmitting hole 122. After the light is dispersed, the photosensitive chip 2 can receive an optical signal by a larger area. Shapes of the third lens 131 and the fourth lens 132 are not limited to shapes in this embodiment. Two adjusting lenses 13 are provided. An optical path may be designed more flexibly. Different shapes may be designed for the third lens 131 and the fourth lens 132 based on a reflection requirement of the optical path.

Optionally, the adjusting lenses 13 include a fifth lens. The fifth lens is arranged close to the photosensitive chip 2. The fifth lens has the same structure as the fourth lens 132. Because the fifth lens has the same structure as the fourth lens 132, light can be further dispersed. This enables the photosensitive chip 2 to receive more light, thereby improving imaging quality of the camera module. The fifth lens is not included in the accompanying drawings of this specification. Specifically, the fifth lens should be disposed between the fourth lens 132 and the filter.

Optionally, as shown in FIG. 1, in the first direction, an area of a projection of the first reflective film 111 on the photosensitive chip 2 is greater than an aperture of the light-transmitting hole 122. In order to prevent light from being directly emitted to the photosensitive chip 2 and received by the photosensitive chip 2, an area of the first reflective film 111 needs to be increased, so that incident light that may be directly incident to the photosensitive chip 2 is reflected out of the camera module.

Optionally, as shown in FIG. 1, the camera module further includes a lens assembly 1, a stabilization motor 3, a filter 4, a circuit board 5, and a bracket 6. The first lens 11 and the second lens 12 are mounted in the lens assembly 1. The lens assembly 1 is secured in the stabilization motor 3. The stabilization motor 3 is securely connected to the bracket 6. The photosensitive chip 2 is disposed in the bracket 6. The filter 4 is disposed between the second lens 12 and the photosensitive chip 2. The circuit board 5 is electrically connected to the photosensitive chip 2. The lens assembly 1 performs functions of transmitting, reflecting, and refracting light. After incident light is emitted to the lens assembly 1, a portion of the incident light incident to the first lens 11 is reflected by the first reflective film 111, and thus cannot pass through the first lens 11. Light incident to the circumference on the top surface of the first lens 11 passes through the first lens 11, and is emitted from the top surface of the second lens 12 to the bottom surface of the second lens 12 after being refracted by the first lens 11. After being reflected by the third reflective film 121 on the bottom surface of the second lens 12, light is emitted to the second reflective film 112 on the bottom surface of the first lens 11. The second reflective film 112 is provided with an arc surface facing the first direction, and can not only receive more reflected light, but also gather light and reflect the light into the light-transmitting hole 122. After passing through the third lens 131, light is refracted and is gathered in an axial direction of the lens assembly 1, so that the light is prevented from being emitted to the hole wall of the light-transmitting hole 122. After passing through the third lens 131, the light passes through the fourth lens 132 and the fifth lens respectively. The fourth lens 132 and the fifth lens disperse the light in directions away from the axial direction of the lens assembly 1, so that the light can be scattered over the photosensitive chip 2 as uniform as possible. In addition, the filter disposed between the fifth lens and the photosensitive chip 2 is configured to achieve effects of allowing visible light to pass through and intercepting near-infrared light, thereby further improving the imaging effect of the camera module. Because a magnification of the camera module is large, a slight shake during shooting with a large magnification leads to a blurred image. For this reason, the stabilization motor 3 is added. After sensing a shake in a shooting process, the stabilization motor 3 drives the lens assembly 1 to perform adjustment, thereby canceling the shake, and ensuring image stability and clear imaging. The circuit board 5 performs a transmission function of providing an electrical signal for the photosensitive chip 2. The bracket 6 provides mounting space for each structure of the camera module, and can protect a structure in the camera module from being damaged.

Optionally, as shown in FIG. 1, the first lens 11 and the second lens 12 are glass lenses. The glass lenses have refractive indexes ranging from 1.34 to 1.8, and have high transmittance. In an incident process of light, a size of the first lens 11 that receives the light is large. Correspondingly, a range of incident light is wide. In this case, a glass lens having a high refractive index is required, so that light can be emitted to the second lens 12 as much as possible. Refraction occurs when the second lens 12 receives light and reflects light. To ensure that sufficient light can be incident to the second reflective film 112, the second lens 12 is also required to have high transmittance and a high refractive index.

Optionally, as shown in FIG. 1, the third lens 131, the fourth lens 132, and the fifth lens are plastic lenses. The plastic lenses have refractive indexes ranging from 1.5 to 1.6. The refractive index can meet a requirement for guiding light to the photosensitive chip 2. Moreover, the plastic lenses are convenient to mount and have low costs, thereby lowering difficulty in production and processing.

Optionally, as shown in FIG. 1, in the first direction, an area of a projection of the first lens 11 on the photosensitive chip 2 is less than an area of a projection of the second lens 12 on the photosensitive chip 2. A size of the second lens 12 needs to be increased, to increase utilization of incident light, ensure that a refraction effect is more diffused after incident light passes through the first lens 11, and ensure that the second reflection surface can receive more light. Because the first lens 11 and the second lens 12 are disposed coaxially, the projection of the second lens 12 on the photosensitive chip 2 covers the projection of the first lens 11 on the photosensitive chip 2. This ensures that incident light can be emitted to the photosensitive chip 2 as much as possible after a plurality of times of reflection and refraction, thereby improving the imaging effect.

An embodiment of this application provides an electronic device. The electronic device is provided with the display module in any one of the above embodiments. The following uses mobile phones as an example. Nowadays, mobile phones in the market become increasingly thinner, to improve grip feelings of users and further improve use experience of the users. However, requirements for picture and video taking effects of mobile phones in the market are also increasingly strict. An imaging effect of a mobile phone affects a sales volume of the mobile phone to some extent. When the camera module in the foregoing embodiment is used in a mobile phone, a clear long-distance picture taking effect can be achieved on the premise that a thickness of the mobile phone is not changed. This not only meets users' requirements for a hand feeling of the mobile phone, but also meets users' requirements for the picture taking effect of the mobile phone.

Figure 2:
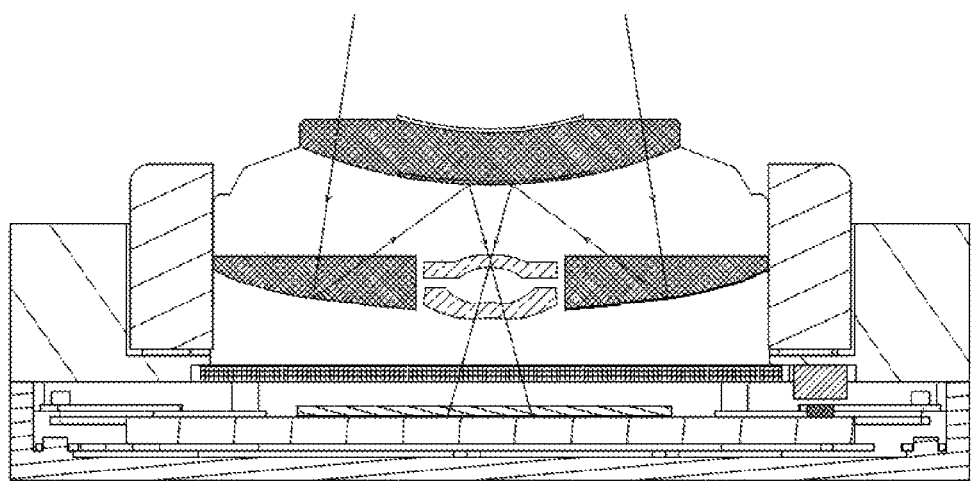
FIG. 2 is a diagram of an optical path of the camera module in FIG. 1.

Specifically, FIG. 2 is a diagram of an optical path of the camera module in this application. After being incident to the camera module through the top surface of the first lens 11, light is incident to the second lens 12, then reflected to the second reflective film 112 through the third reflective film 121, and finally incident to the photosensitive chip 2 after passing through the fourth lens 132 and the fifth lens in the light-transmitting hole 122. The photosensitive chip 2 converts an optical signal into an electrical signal, and transmits the electrical signal to the electronic device through the circuit board 5.

The embodiments of this application are described above with reference to the accompanying drawings. However, this application is not limited to the foregoing specific implementations. The foregoing specific implementations are merely illustrative instead of restrictive. Under the enlightenment of this application, a person of ordinary skill in the art may make many forms without departing from the essence of this application and the protection scope of claims, all of which fall within the protection of this application.

What is claimed is:

1. A camera module, wherein the camera module comprises a first lens, a second lens, and a photosensitive chip that are coaxially disposed in a first direction sequentially, the first direction is a thickness direction of the camera module, a clearance is disposed between every two of the first lens, the second lens, and the photosensitive chip, a first reflective film is disposed on a side of the first lens away from the second lens, a second reflective film is disposed on a side of the first lens close to the second lens, the second lens is entirely provided with a third reflective film on a side close to the photosensitive chip, a light-transmitting hole is provided on a middle part of the side of the second lens close to the photosensitive chip, and at least two adjusting lenses are disposed in the light-transmitting hole.

2. The camera module according to claim 1, wherein a middle part on the side, away from the second lens, of the first lens is provided with a first arc surface, a circumference on the side, away from the second lens, of the first lens is a plane, the first reflective film covers the first arc surface, the side, close to the second lens, of the first lens is provided with a second arc surface, a side, away from the photosensitive chip, of the second lens is a plane, the side, close to the photosensitive chip, of the second lens is provided with a third arc surface, and the first arc surface, the second arc surface, and the third arc surface are all arranged towards the first direction.

3. The camera module according to claim 1, wherein the adjusting lenses comprise a third lens and a fourth lens in the first direction sequentially, a middle part of the third lens protrudes in a second direction, a middle part of the fourth lens protrudes in the first direction, a central region of the fourth lens protrudes in the first direction, and the first direction is opposite to the second direction.

4. The camera module according to claim 3, wherein the adjusting lenses comprise a fifth lens, the fifth lens is arranged close to the photosensitive chip, the fifth lens has the same structure as the fourth lens.

5. The camera module according to claim 4, wherein the third lens, the fourth lens, and the fifth lens are plastic lenses.

6. The camera module according to claim 1, wherein in the first direction, an area of a projection of the first reflective film on the photosensitive chip is greater than an aperture of the light-transmitting hole.

7. The camera module according to claim 1, wherein the camera module further comprises a lens assembly, a stabilization motor, a filter, a circuit board, and a bracket, the first lens and the second lens are mounted in the lens assembly, the lens assembly is secured in the stabilization motor, the stabilization motor is securely connected to the bracket, the photosensitive chip is disposed in the bracket, the filter is disposed between the second lens and the photosensitive chip, and the circuit board is electrically connected to the photosensitive chip.

8. The camera module according to claim 1, wherein the first lens and the second lens are glass lenses.

9. The camera module according to claim 1, wherein in the first direction, an area of a projection of the first lens on the photosensitive chip is less than an area of a projection of the second lens on the photosensitive chip.

10. An electronic device, wherein the electronic device is provided with a camera module;
wherein the camera module comprises a first lens, a second lens, and a photosensitive chip that are coaxially disposed in a first direction sequentially, the first direction is a thickness direction of the camera module, a clearance is disposed between every two of the first lens, the second lens, and the photosensitive chip, a first reflective film is disposed on a side of the first lens away from the second lens, a second reflective film is disposed on a side of the first lens close to the second lens, the second lens is entirely provided with a third reflective film on a side close to the photosensitive chip, a light-transmitting hole is provided on a middle part of the side of the second lens close to the photosensitive chip, and at least two adjusting lenses are disposed in the light-transmitting hole.

11. The electronic device according to claim 10, wherein a middle part on the side, away from the second lens, of the first lens is provided with a first arc surface, a circumference on the side, away from the second lens, of the first lens is a plane, the first reflective film covers the first arc surface, the side, close to the second lens, of the first lens is provided with a second arc surface, a side, away from the photosensitive chip, of the second lens is a plane, the side, close to the photosensitive chip, of the second lens is provided with a third arc surface, and the first curved surface, the second curved surface, and the third curved surface are all arranged towards the first direction.

12. The electronic device according to claim 10, wherein the adjusting lenses comprise a third lens and a fourth lens in the first direction sequentially, a middle part of the third lens protrudes in a second direction, a middle part of the fourth lens protrudes in the first direction, a central region of the fourth lens protrudes in the first direction, and the first direction is opposite to the second direction.

13. The electronic device according to claim 12, wherein the adjusting lenses comprise a fifth lens, the fifth lens is arranged close to the photosensitive chip, the fifth lens has the same structure as the fourth lens.

14. The electronic device according to claim 13, wherein the third lens, the fourth lens, and the fifth lens are plastic lenses.

15. The electronic device according to claim 10, wherein in the first direction, an area of a projection of the first reflective film on the photosensitive chip is greater than an aperture of the light-transmitting hole.

16. The electronic device according to claim 10, wherein the camera module further comprises a lens assembly, a stabilization motor, a filter, a circuit board, and a bracket, the first lens and the second lens are mounted in the lens assembly, the lens assembly is secured in the stabilization motor, the stabilization motor is securely connected to the bracket, the photosensitive chip is disposed in the bracket, the filter is disposed between the second lens and the photosensitive chip, and the circuit board is electrically connected to the photosensitive chip.

17. The electronic device according to claim 10, wherein the first lens and the second lens are glass lenses.

18. The electronic device according to claim 10, wherein in the first direction, an area of a projection of the first lens on the photosensitive chip is less than an area of a projection of the second lens on the photosensitive chip.

* * * * *